Dec. 21, 1965    C. L. AUERNHEIMER    3,224,115
AUTOMATIC MUTING SYSTEM
Filed April 15, 1963
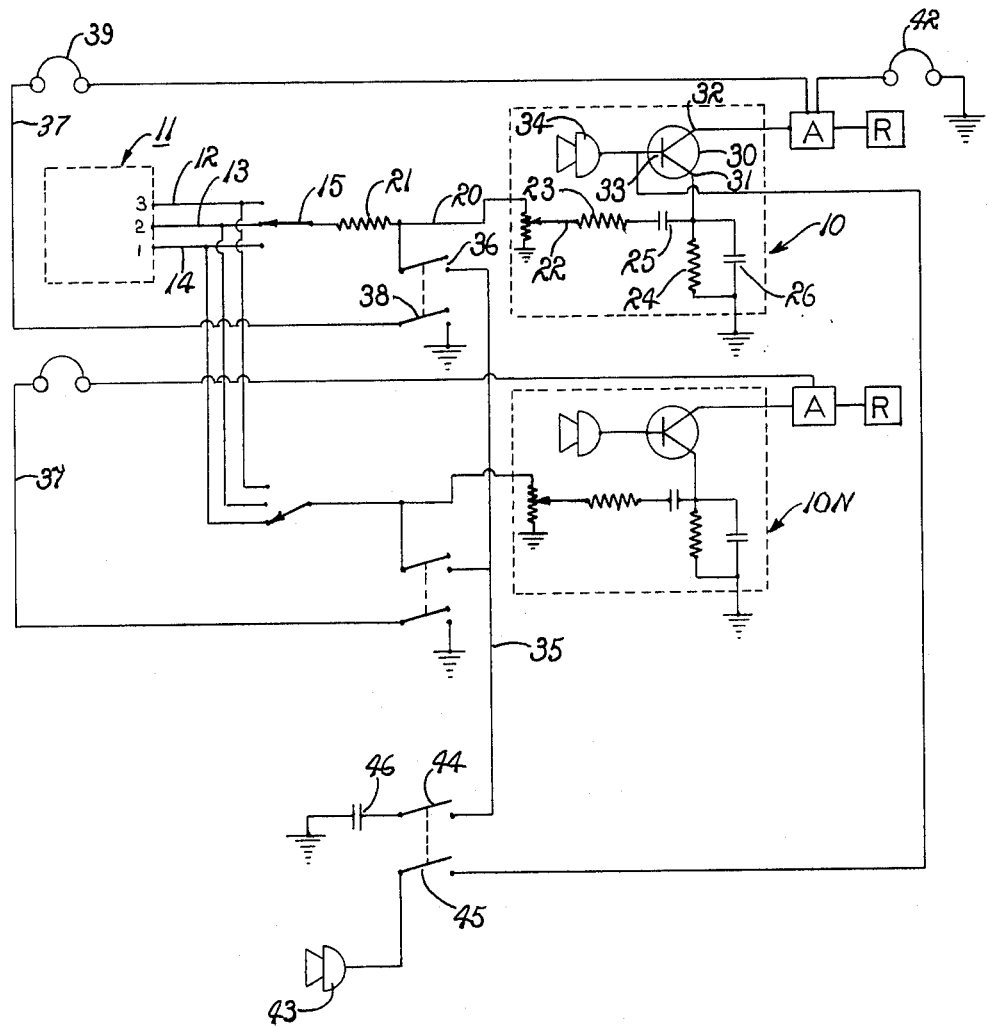
CLARENCE L. AUERNHEIMER
INVENTOR
HUEBNER & WORREL
ATTORNEYS
BY
Richard M. Worrel

United States Patent Office 3,224,115
Patented Dec. 21, 1965

3,224,115
AUTOMATIC MUTING SYSTEM
Clarence L. Auernheimer, Fresno, Calif., assignor to A.V. Electronics, Inc., Fresno, Calif., a corporation of California
Filed Apr. 15, 1963, Ser. No. 273,004
5 Claims. (Cl. 35—35)

This invention relates in general to the muting of an audio signal traveling from a source to a remote station and more specifically to a language teaching laboratory wherein a plurality of student stations receive a signal from one audio source and which incorporates a muting system permitting any one, or a group of such stations to have the signal from the master source muted without affecting the remainder of stations in the system.

Accordingly, it is an object of the present invention to provide circuitry which includes a first circuit from an audio source to a recorder in a student station through an amplifier with a student station microphone operating through the same amplifier, wherein power transmitted through the first circuit substantially matches the power of the student microphone output, and to provide a second circuit as a grounding system to mute the signal from the source without affecting the remainder of the system.

More specifically, it is an object of this invention to have a series of student stations all supplied by parallel circuits from a single audio source, wherein an instructor may ground out and thereby mute the audio signal to any one or several stations through a common ground line without in any way affecting the other systems remaining in operation.

It is a further object of the invention to minimize the number of switches normally required for muting such a system by conventional means.

Another object of this invention is to provide a system of the character described which enables the muting of a single student station or the simultaneous muting of any number of such student stations at the same time, with no audible sound to any station because of the muting operation.

A still further object is to provide such a system which enables an instructor to monitor any student at any time without giving any indication of such monitoring, and to mute the source from the student and to speak to the student or students at any moment selected.

Another object of the invention is to reduce the cost of laboratory teaching systems by eliminating relay systems normally incorporated therein and as a result thereof eliminate audible noises and failures caused by using secondary relay contacts.

The drawing is a wiring diagram which illustrates the preferred embodiment of the invention in a language teaching laboratory.

Language teaching laboratories are being adopted and widely employed for the purpose of enabling a multiple number of students to participate in recorded instruction and response under the supervision and control of one instructor or monitor. The teaching is not limited to language, but finds its largest adaptation in this field at the present time.

Teaching laboratory systems are generally of three broad classifications. First, the simplest and least costly system employs a recorded source and a plurality of individual stations for students, where each student is provided with headset earphones to listen to the instruction or spoken example coming from the instructor. The student can do nothing but make pencil notes or respond verbally without the ability to hear himself as he speaks. The present invention has litle practical use for this level of instruction. The next system level, therefore, adds to the basic system a microphone for the student and means for the student to hear his own voice along with the voice from the master recording. Thus, the student can respond and match his response with the master. Finally, the third broad class employs a recording device which can record the signal which comes from the master recording and can record the student's response on another area of the recording media. Thus, the student may review both the master and his own response. In still a further improved system, the student may thereafter erase his own response and practice responding again and again as he records and erases until he is satisfied with his results and their comparison with the master recording.

There are various further refinements in each of the broad classifications, but this background will suffice for an introduction to the improvement of the present invention. As an example, the laboratories are usually equipped with intercommunication systems whereby the student can speak to the teacher and the teacher can speak to the student without having to pick up a separate telephone device, and without acoustical transmission by speaking across the area between the teacher and student, thus interrupting and disturbing other students. Furthermore, the person in charge of the instruction may desire from time to time to monitor the student reponse. Most laboratories, therefore, are equipped in such manner that the teacher can listen in on the student as he responds. If the person in charge believes the student to need some assistance, he may then interrupt and so advise the student.

It would not be desirable or useful to have the voice of the teacher merely superimposed upon that of the incoming instruction from the recording. Therefore, it is desired that the master signal be muted or otherwise cut off from the student before the teacher speaks to the student. It is a new and improved system for muting the signal from the master recording to any one of a number of student stations that constitutes the subject matter of the present invention.

The physical implements and arrangement of the laboratory may vary within wide limits. Hence, the general wiring diagram pertaining to the present invention is illustrated in the drawing and this wiring diagram may be integrated with other portions of the complete system and located at the most suitable location according to the needs of the laboratory.

Referring now to the drawing, the dotted outline areas indicated by the reference character 10 indicate a student station, and the reference character 10N suggests that a plurality of such stations up to any desired number "N" may be employed. The systems within the two illustrated blocks 10 and 10N are identical and remarks hereafter will be confined to the first of the two blocks bearing the reference character 10 although applicable to 10N.

A source of audio frequency is indicated by the dotted outline area 11. Such source is usually a tape transcriber, or may be a disk turntable, playing through ordinary turntable devices and amplifiers. There are three wires 12, 13 and 14 coming from the source 11 and they are intended to suggest that a plurality of such sources may be employed. In the same room there may be students at various levels of learning, and they may select from the proper source according to their level of learning. This three source system is no limiting feature of the present invention.

In order to select the particular source, a switch 15 is provided and the instructor connects the student station 10 or 10N to the proper source desired for that student or students. This selector switch 15 is located at a teacher's console.

Transmission line 20 from the switch 15 to the student station 10 may be of any suitable length needed for the transmission of the signal. In this line, there is included a resistor 21 serving essentially as an isolation resistor. At the student station, there is a grounded variable resistor 22 which the student employs to control the volume which he hears at his station. Because the variable resistor is grounded, the resistors 21 and 22 comprise a voltage divider system. A signal proceeding along line 20 is divided at the variable resistor, one portion being shunted to ground and the other portion proceeding to the student station at a volume dependent on the relative voltage drops across resistors 21 and the non-shunting portion of resistor 22 combined, and the shunt portion of resistor 22 respectively. By this circuiting a voltage reduction is selectively effected in the transmission line. This is the first of two such divider systems or circuits.

From the first voltage divider stage consisting of resistors 21 and 22, a voltage coming from the source 11 is directed to a resistor 23. A resistor 24 is connected in series with resistor 23 through condenser 25. Resistor 24 is grounded and hence, a voltage may be tapped off of the line between resistors 23 and 24 and these two resistors serve as the second voltage divider stage. Similarly to the first voltage divider stage, a predetermined portion of the transmitted signal is shunted to ground proportionate to the respective voltage drops across resistors 23 and 24, thus effectively dividing the voltage and corresponding signal into a selected useful portion and an unused portion respectively. By proper selection of resistance 24 according to conventional circuitry theory a proportionate voltage reduction is obtained in the line leading to the student station. The condenser 25 serves to isolate the line 20 from the balance of the system with respect to direct current.

A transistor 30 is illustrated as the first stage of amplifying apparatus located at the student's station 10. No more of the amplifying apparatus, or other apparatus which may be needed for recording, is illustrated. The transistor 30 has an emitter 31 connected between resistors 23 and 24 and, as suggested, the resistors serve as a further voltage divider and hence, reduce the voltage to a selected level before it is applied to the emitter 31 of the transistor. A condenser 26 bypasses the resistor 24 and the units 25 and 26 provide the necessary emitter bias for the first stage of amplification and reduce degeneration of any current directed into the base 33 of the transistor. Condenser 26 has a value selected such that a signal fed into the emitter 31 and from the line 20 will appear and be amplified.

The student microphone is indicated by the reference character 34 and the microphone input is fed into the base 33 of the transistor and passes through the transistor to the collector 32. The signal from the line 20 is fed to the emitter 31 and passes without amplification to the collector 32. From collector 32 the signal is amplified by amplifier "A" and then is available for recording on recorder "R" and may be heard through audio headphones.

The condenser 26 serves another important function in that it effectively bypasses the microphone signal to ground. That is, it reduces degeneration. This simply means that very little microphone signal appears at the emitter of this first stage of amplification.

As this far described, it will be understood how the signal from the master is transmitted through a series of devices to the place where it is mixed with the student response and amplified suitably for recording. This function could be accomplished by apparatus other than that illustrated, but the described apparatus and relationship provides a typical environment which will enable the next, or muting, portion of the device to be understood.

A single line 35, known colloquially as a "bus" line because it is common to all of the stations of the system, is a short circuit ground for the master signal whenever interconnected in the proper position in each student's system. The bus line 35 is connected through a switch 36 to a position in the first voltage divider system where the voltage may be grounded and effectively prevent the transmission of a useful voltage to the second voltage divider station as well as preventing interference with the other student stations 10N still connected to the master signal source. If grounded, the master is muted and no signal goes to the student station. The student nevertheless, can speak into the system and hear any signal coming from another source. The system is not rendered inoperative in any respect. The source signal is simply diverted from the system. To accomplish this diversion, the bus line 35 is connected to the student line 20 on the side of the resistor 21 opposite from the master signal.

Separately from the wiring diagram described, there is illustrated an extension line system 37 having one teacher's headphone 39 and a separate switch 38 associated with each of the student stations 10. The line 37 extends to and connects into the line leading from collector 32 of transistor 30. Thus, the teacher can close the circuit to the headphone 39 by closing switch 38 and listen to the master and the student's response.

Simultaneously, with the closing of switch 38, the switch 36 is closed by means of a physical gang relationship between switches 38 and 36. Thus, the teacher, in throwing the communicate switch 38 to listen, sets up a student station preparatory for grounding by connecting that station into the bus line 35. However, bus line 35 is inoperative until connected to ground.

The student hears the output from amplifier A through headphone 42. To speak to the student, a microphone 43 at the teacher's console is connected to the base 33 of transistor 30 and is therefore amplified by the amplifier A and is heard in headphone 42.

As this far described, the teacher and student both hear the output of the master and the student response. If the teacher were to inject another voice, the result would be confusion. To prevent such confusion, a switch 45 is provided to connect and disconnect microphone 43.

A switch 44 to ground through condenser 46 is provided as the means to ground bus line 35. Bus line ground switch 44 is ganged to switch 45. Thus, when switch 45 is closed, bus line 35 is grounded. When grounded, the signal from the master is shunted to ground and the source becomes silent. Simultaneously, the teacher may speak to the student in place of the master. If recording equipment is in use, the teacher is recorded along with the student reply. The student may later listen to hear what he was doing that brought about the interruption by the teacher, and listen thereafter to the instructions for correction.

The drawing is simplified for ease of description. Each student has a switch 45 at the console and a headset 42 at his desk, but there need be only one teacher's microphone 43. The wiring diagram is outside the scope of this invention and will be understood by the technician designing any particular installation.

Referring now once again to the components of the particular system, it was previously explained how the use of the condenser 26 as a bypass for the resistor 24 allows very little signal from the students microphone to appear at the emitter of the first stage of recording. The minute signal that does appear is blocked from the prior circuit by the high value of resistor 23 having a high impedance in comparison with the low impedance value for resistor 24. The meaning of this is that the master signal and the microphone signal are mixed in the first stage and essentially isolated in order that no microphone signal from the particular student station can appear in another student station. This arrangement reduces the number of component parts needed. It is also important to the economic value of this invention that the component parts illustrated and described are not critical as to value. As much as 20% tolerance on all parts is quite acceptable.

In order specifically to illustrate the invention, Table I below sets forth suitable values of components from the embodiment illustrated in the drawing.

TABLE I

| Reference No. | Device | Value |
| --- | --- | --- |
| 21 | Resistor | 220 ohm. |
| 22 | Variable resistor | 10K ohm. |
| 23 | Resistor | 12K ohm. |
| 24 | ----do---- | 47 ohm. |
| 25 | Condenser | 10 microfarad. |
| 26 | ----do---- | Do. |
| 46 | ----do---- | 100 microfarad. |

These values produce an operative circuit but reasonable variations may be employed without departing from the spirit or scope of the invention. For example, the value for the resistor 21 is shown to be quite low in order to emphasize the extreme limits to which a practical embodiment can be carried. At a 220 ohms value for resistor 21, forty or more student stations may be employed and the connection of the many resistors 21 in parallel will nevertheless represent an impedance about equal to the usual three ohm impedance output signal from a master tape. Most portable equipment used for master sources have an external speaker output which generally is about 3.2 ohms. With the value of 220 ohms for all of the resistors, a full classroom of third level apparatus may be used. However, to provide a huge factor of overload safety, a resistor value of 12K ohms is used in actual practice. No practical group would overload a system wherein resistances of the value are placed in parallel relationship.

It will be evident from the foregoing that the present invention enables the provision of language teaching laboratory systems and the like wherein a plurality of student stations receive a signal from a common audio source and in which any one, or a group, of such stations can have the audio source muted with respect to it without affecting the operation of the remainder of the student stations. Further, the invention enables the provision of such systems in which an instructor can monitor any student station at any time without signaling such station, can mute any student station at will, and can converse with any selected station or stations without affecting any other station.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. A teaching device comprising an audio frequency signal supply means, a student station connected to the supply means to receive the signal, a first resistor in series with said supply means, a ground line connected to the side of said resistor opposite from said supply means, a second resistor having a grounded variable resistance, said first and second resistors being connected to said signal supply means as a voltage divider circuit, a recorder, circuit means connected from said voltage divider circuit to the recorder, a microphone at said student station, means substantially matching cooperatively with the voltage divider circuit the microphone output voltage with the output voltage of the supply signal which passes through said circuit means, so that signals from both sources may be recorded on the recorder, a communication circuit connected to the student station and including a microphone and a receiver, two normally open switches connected respectively in said line to ground and in the communication circuit at said microphone, and means operable to close and open said switches in unison.

2. A language laboratory system comprising a low impedance audio input master supply, a plurality of independent student stations each connected to receive the signal from said supply, and a common ground connectable to each of said plurality of stations to short out said signal before reaching said station when so connected, each said station having circuitry from said master supply including a first and second voltage divider system in series, said first voltage divider system including a grounded variable resistance for volume control of said signal, said second voltage divider system being supplied from the first through the grounded variable resistance, each station including a transistor having a base and an emitter, a microphone connected to the base of said transistor, a lead connection from said second voltage divider to the emitter of said transistor, said first and second voltage divider systems providing voltage reduction from said master supply to said emitter substantially to match the input to the transistor from said base microphone and the emitter, the output thereby being suitable as a recordable signal from both sources to a recording device, switch means connected to said common ground and to said first voltage divider system between voltage drop devices thereof, and a capacitance in series with said switch means to ground out alternating current audio signal frequency.

3. A teaching device comprising means for sensing a recorded master and producing an audio frequency electrical signal corresponding thereto, a student station having a microphone adapted to produce an audio frequency electrical signal corresponding to acoustical signals supplied to the microphone, first receiver means at said student station connected to the sensing means and to the microphone adapted to convert both said electrical signals to acoustical signals, second receiver means at a position remote from the student station connected to the sensing means and the microphone adapted to convert both said electrical signals to acoustical signals, a second microphone located in proximity to said second receiver means, switch means adapted selectively to connect said second microphone to the first receiver means to supply an audio frequency electrical signal to said first receiver means and to disconnect the second microphone therefrom, and muting means adapted to ground out said means sensing the recorded master thereby to prevent the signal thereof from reaching said first receiver means, said muting means producing said ground connection as a function of said switch means as the second microphone is connected to the first receiver means thereby substituting the second microphone for said recorded master.

4. A teaching device comprising means for sensing a recorded master and producing an audio frequency electrical signal corresponding thereto, a student station having a microphone adapted to produce an audio frequency electrical signal corresponding to an acoustical signal supplied to the microphone, first receiver means at said student station connected to the sensing means and to the microphone adapted to convert both said electrical signals to acoustical signals, second receiver means at a position remote from the student station connected to the sensing means and to the microphone adapted to convert both said electrical signals to acoustical signals, a second microphone located in proximity to said second receiver means, a circuit from said second microphone to said first receiver means, switch means adapted selectively to connect said second microphone to the first receiver means to supply an audio frequency electrical signal to said receiver means and to disconnect the second microphone therefrom, and muting means adapted to ground out said means sensing the recorded master thereby to prevent the signal thereof from reaching said first receiver means, said muting means producing said ground connection as a function of said switch means as the second microphone is connected to the first receiver means thereby substituting the second microphone for said recorded master.

5. A teaching laboratory comprising means for producing an electrical signal from a recorded source, a student station having a microphone and a receiver adapted to produce an audio equivalent of the signal for the instruction of a student, first transmission means interconnecting the signal producing means and said receiver, second transmission means connected to both the signal producing means and the student station microphone as intelligence sources, a monitor receiver, switch means for connecting said monitor receiver to said second transmission means and disconnecting it therefrom, a shunt grounding line open at both ends, said shunt grounding line being adapted to shunt to ground the signal from said signal producing means when closed to the said means and to ground, a first grounding line switch connected to the shunt grounding line by closing said switch means to monitor the student station, the closing of said first ground line switch establishing contact of said grounding line to said second transmission means, a monitor microphone, third transmission means interconnecting the monitor microphone and the student receiver for supplying signals from said monitor microphone to said student receiver, and a second ground line switch connected to the shunt grounding line and to the third transmission means simultaneously closing said ground line to ground and activating said third transmission means from monitor microphone to student station.

References Cited by the Examiner
UNITED STATES PATENTS

| | | | |
|---|---|---|---|
| 2,110,358 | 3/1938 | Dreisbach | 179—1.1 |
| 2,830,127 | 4/1958 | Ferguson et al. | |
| 3,045,065 | 7/1962 | Metzner | 35—35.3 X |
| 3,069,789 | 12/1962 | Knight et al. | 35—35.3 |

OTHER REFERENCES

RCA: "Language Laboratory Systems," Installation Manual, dated June 1959, 29 pages plus covers, pages 18 and 19 relied on. Available in Group 470.

EUGENE R. CAPOZIO, *Primary Examiner.*

LAWRENCE CHARLES, JEROME SCHNALL,
*Examiners.*